Patented Sept. 2, 1930

1,774,812

UNITED STATES PATENT OFFICE

STUART M. PHELPS, OF PITTSBURGH, PENNSYLVANIA

ARTICLE OF COMMERCE AND METHOD OF ITS PRODUCTION

No Drawing.  Application filed May 15, 1928. Serial No. 278,046.

My invention consists in a new article of commerce and in the method of its production. While not necessarily limited to such use, the article finds practical application as a substitute for soapstone in the formation of table tops for laboratories, screens for lavatories, flooring, in building generally, and in the formation of utensils, and it is generally useful as a substitute where soapstone, because of its inertness to chemical reaction and imperviousness is found serviceable. Its advantage lies in cheapness of production and fabrication, and in variability in composition and quality, to meet particular conditions.

The article may be defined according to the manner of its production as a porous ceramic body, produced by burning a shaped mass of ceramic material mixed with a combustible substance, the porous ceramic body being filled with another substance applied in liquid condition, and the product being dense, hard, impervious, and, by proper selection of ingredients susceptible to high polish, and being relatively inert chemically.

A typical procedure in the practice of the invention is as follows,—Making choice among ceramic materials available, I take Georgia kaolin, 35%; Tennessee ball clay, 20%; and feldspar, 15%. To this I add material suitable to correct shinkage, as the ceramic art knows how to do. In this instance I take silica, 20%. And as a combustible substance I take sawdust, 10%. The sawdust is reduced to a condition termed wood flour. All the materials are finely divided, to such degree preferably as to pass through a 60-mesh sieve. The whole is worked with water to a suitable consistency, formed in a mold in usual manner, dried, and fired.

In firing the temperature rises slowly to, approximately, 1150° C. The fired article is porous, light, soft, and of chalky character, and may then easily be shaped. The fired article is impregnated with a material which when impregnation is effected is liquid, but which after impregnation gives to the article its desired dense and inert character. In this exemplary case I impregnate with sulphur, rendered fluid by melting. Impregnation may be effected by mere immersion; or it may be facilitated and hastened by the known means of suction and pressure.

In place of the particular ceramic body specified, a wide field of mixtures or bodies known to the ceramic art is available. In place of sawdust, other combustibles are available; cellulose, for example, cork, charcoal, coke, and carbon in other forms. If capillary pores be desirable, to assist in impregnation, the otherwise powdered material may be mixed with hair as the combustible substance.

In molding, it will be desirable to make the article over-size, and then after burning and before impregnation, the porous article may be dressed and more minutely and exactly shaped. Herein lies a notable advantage in practicing the invention, particularly when the product is to be employed in place of or as a substitute for soapstone or other hard material. The porous base body may with relative ease be shaped as desired and thereafter by impregnation density hardness and other qualities may be imparted to it.

In place of an impregnating substance normally solid but rendered liquid by heat, the substance may be rendered liquid by solution. For instance, a phenol condensation product may be employed in a condition of solution. After impregnation, the solvent may by evaporation escape, leaving the phenol product in place, filling the pores of the fired base body. Other impregnating substances which to meet particular uses may be found desirable, are asphalt, and casein products.

Impregnation may be of more sorts than one. For instance after the fired and porous base body has been prepared, it may be coated over a portion of its surface with paraffine, submerged in a solution of a phenol condensation product, and allowed to remain submerged for a suitable length of time, and the solution then will penetrate through the exposed surface inward to a relatively small but sufficient depth,—say a quarter of an inch. At proper time the article may be removed from the solution and the solvent may be allowed to evaporate. The paraffine coating may then be removed, and the article then may be submerged again in molten sulphur, and all of the porous base body not already filled with the phenol product may then be filled with sulphur. Such compound impregnation may be resorted to, in order to meet particular conditions of service, or in order to effect economy,—the more valuable impregnating material or the material more difficult of impregnation, but for other reasons preferable, may be applied over the surface ultimately to be exposed, and the cheaper material filling the porous body elsewhere.

Again, the partial impregnation through one surface or through a desired portion of the entire surface of the body may, without further treatment, afford an article suitable for particular uses. And the so partially impregnated body will then be the finished product,—subject, of course, to such finishing and polishing operations (if any) as has been indicated.

The finished article may still be cut, dressed, and polished.

I claim as my invention:

1. A massive, coherent, inert article of laboratory furniture consisting of a porous base body of ceramic material, filled with another substance solidified from molten state in its pores.

2. A new article of manufacture consisting of a porous base body of ceramic material, filled with sulphur.

3. A new article of manufacture consisting of a porous base body of ceramic material impregnated throughout part only of its thickness and from the surface inwardly with a pore-filling substance.

4. A new article of manufacture consisting of a porous base body of ceramic material impregnated throughout different portions with a plurality of different pore-filling substances.

5. The method herein described of producing a ceramic product which consists in firing to a porous solid a shaped blank formed of ceramic clay mixed with combustible material, re-shaping the product, and filling the re-shaped product with an impregnating substance in liquid condition.

6. The method herein described of producing a ceramic product which consists in mixing a ceramic body with a combustible substance, shaping the body and firing to a porous solid, filling the pores of a portion only of such porous solid with an impregnating substance in liquid condition.

7. The method herein described of producing a ceramic product which consists in firing to a porous solid a shaped blank formed of a ceramic clay mixed with combustible material, and impregnating such solid through different portions of its extent with different pore-filling substances.

8. The method herein described of producing a ceramic product which consists in firing to a porous solid a shaped blank formed of a ceramic clay mixed with combustible material, causing a filling substance in condition of solution to penetrate a portion of such blank, evaporating the solvent, and causing another substance in molten condition to penetrate another portion of the blank.

9. The method herein described of producing a ceramic product which consists in mixing a ceramic clay with wood flour, shaping the body of clay and firing it to a porous base body, covering the surface of the body in part with a penetration-excluding covering, partially impregnating by immersion the so prepared body with a solution of a phenol condensation product, removing by evaporation the solvent, and immersing the article again with its previously covered surface uncovered, in a bath of molten sulphur.

In testimony whereof I have hereunto set my hand.

STUART M. PHELPS.